Dec. 7, 1926.
H. N. PACKARD
1,609,423
METHOD OF AND APPARATUS FOR DETERMINING THE SPECIFIC HEAT OF FLUIDS
Filed May 28, 1918    2 Sheets-Sheet 1
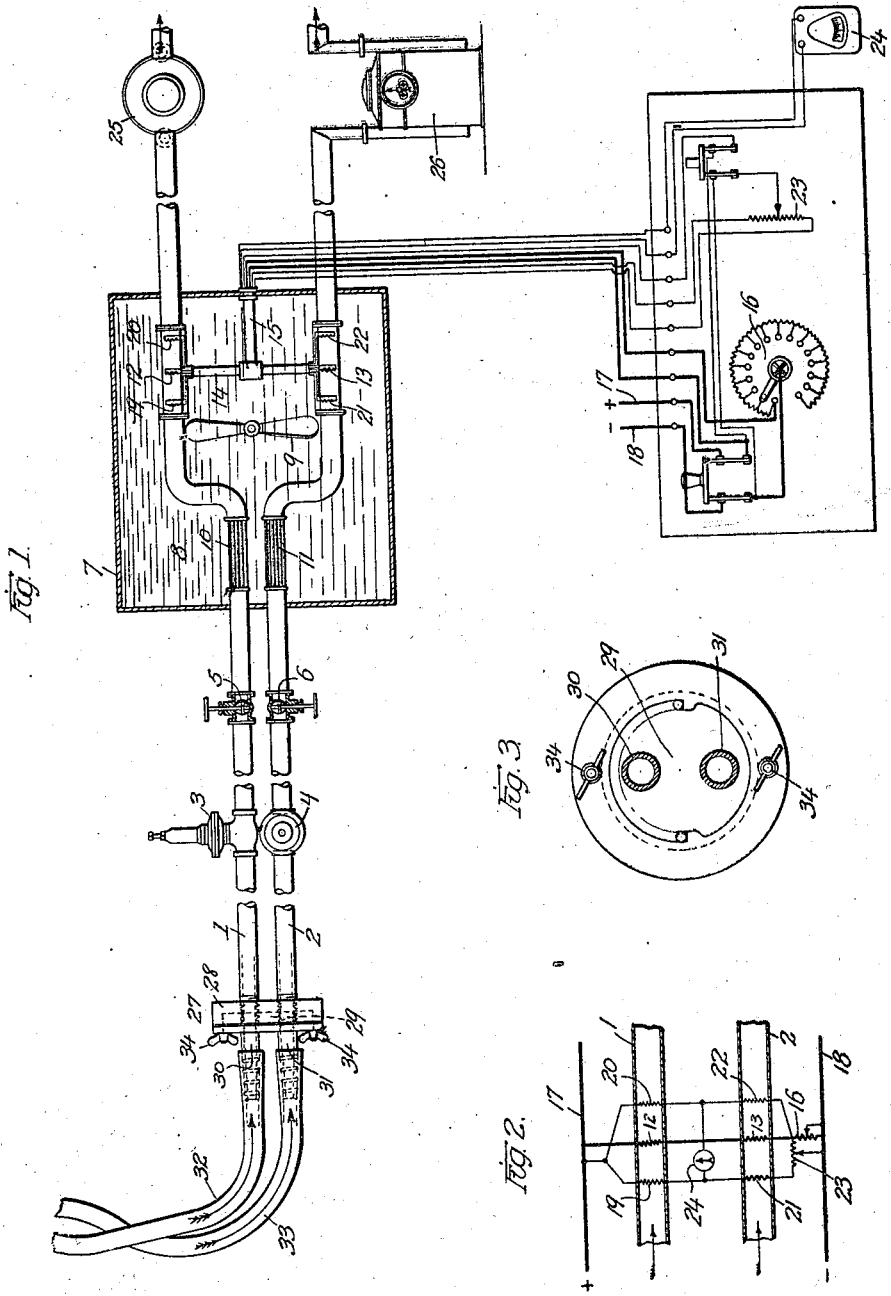

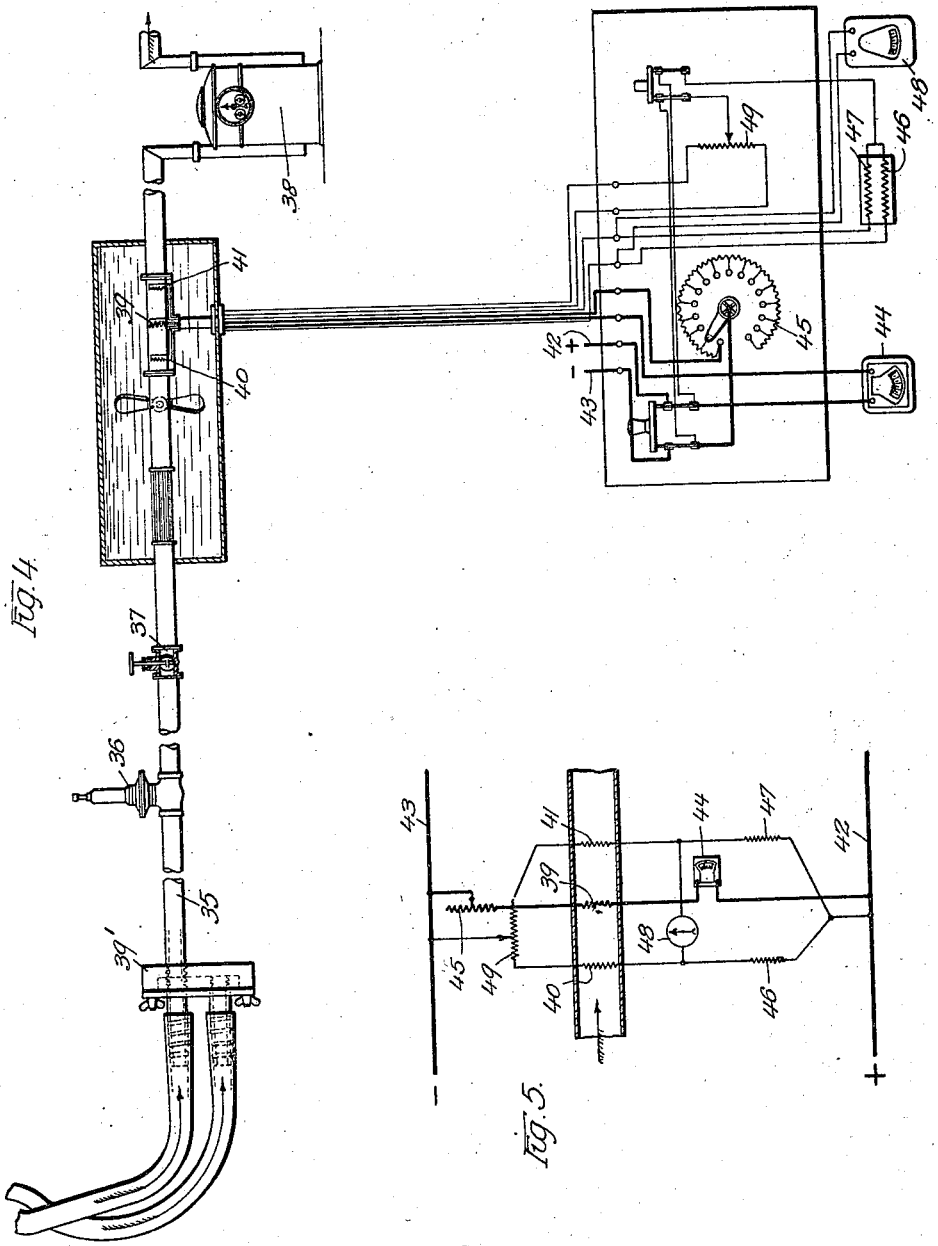

Patented Dec. 7, 1926.

1,609,423

UNITED STATES PATENT OFFICE.

HORACE N. PACKARD, OF MILWAUKEE, WISCONSIN, ASSIGNOR TO THE CUTLER-HAMMER MFG. CO., OF MILWAUKEE, WISCONSIN, A CORPORATION OF WISCONSIN.

METHOD OF AND APPARATUS FOR DETERMINING THE SPECIFIC HEAT OF FLUIDS.

Application filed May 28, 1918. Serial No. 237,101.

This invention relates to the measurement or determination of the specific heat of gases.

In thermal fluid apparatus and methods it is often necessary to know the specific heat of a certain gas. This is particularly true in connection with the measurement of the rate of flow of fluids by thermal methods. Heretofore it has been customary to obtain the specific heat of a certain gas by referring to a table or an authoritative book upon the subject. The figures contained in these tables and books are determined by apparatus which permits of considerable error, and therefore all of the figures cannot be relied upon as being strictly correct. The apparatus heretofore used for determining the specific heat of a gas has been difficult to operate and has required the services of a skilled physicist for even approximate results. There is considerable demand for an apparatus by means of which the specific heat of any gas may be readily, quickly and accurately determined.

One object of the present invention is to provide an improved apparatus for determining the specific heat of a gas.

Another object is to provide an apparatus by means of which the specific heat of a gas may be quickly and accurately determined.

Another object is to provide an apparatus by means of which the specific heat of a gas may be determined in such a way that practically all errors are eliminated.

Another object is to provide means for determining a certain characteristic of a gas in such a way that any errors will be cancelled.

Another object is to provide an improved method of determining the specific heat of gases.

Several embodiments of the invention are illustrated in the accompanying drawings, in which—

Figure 1 is a diagrammatic view of an apparatus constructed in accordance with the invention.

Fig. 2 is a wiring diagram illustrating in a simplified manner the wiring connections shown in Fig. 1.

Fig. 3 is a detail view of the reversing valve employed.

Fig. 4 is a diagrammatic view of a modified form of apparatus, and

Fig. 5 is a simplified diagram of the wiring used in Fig. 4.

The invention may take various different forms, but several embodiments thereof will be described for illustrative purposes. The illustrated embodiments will be described specifically to make their construction and operation clear, but the specific description should not be construed in a limiting sense.

The method in general consists in imparting the same amount of heat to two streams of fluid one of which is a fluid of known specific heat, such as air, and the other of which is the fluid whose specific heat is to be determined. The rate of flow of the fluids is adjusted until the heat that is imparted will produce the same temperature rise in both fluids. The quantity of fluid flowing in each stream is measured. Under the above conditions the ratio between the specific heats of the two fluids will equal the ratio between the quantity factors and hence the unknown specific heat may be readily determined. If the specific heat of the fluid which is used as a standard is unity, the specific heat to be determined will be the ratio between the quantity factors.

One form of apparatus suitable for carrying out the above method comprises in general a pair of conduits through one of which the fluid of known specific heat is passed. The fluid whose specific heat is to be determined is passed through the second conduit. In each conduit there is located an electrical heater for heating the fluid flowing in the conduit. The two heaters are connected in series and are adapted to dissipate equal quantities of heat. In each conduit, in advance of the heater, there is located one thermometer resistance, and in each conduit at the rear of the heater there is located a second thermometer resistance. The four thermometer resistances are connected in the form of a Wheatstone bridge. The apparatus is adjusted so that when the fluids are flowing through the conduits and when no heat is being dissipated from the heaters the Wheatstone bridge will balance. Energy is then supplied to the heaters and the Wheatstone bridge will immediately unbalance for the reason hereinafter given. The flow of one or both of the fluids is then regulated until the balance of the Wheatstone bridge is restored. By measuring the quantity of fluid flowing through each conduit and determining the ratio between these two factors; the specific heat of one of the fluids may be readily determined with respect to the other which serves as a standard.

In order to eliminate errors a reversing valve is then operated to cause each fluid to flow through the conduit through which the other fluid previously passed. A second set of readings is thus obtained and from the two readings an accurate determination of the specific heat of one of the fluids may be readily determined.

The two conduits through which the fluids flow are shown at 1 and 2, respectively. The conduit 1 may be provided with a pressure regulator 3 and the conduit 2 may be provided with a similar pressure regulator 4. A regulating valve 5 when adjusted serves to regulate the flow of fluid through the conduit 1, and a similar valve 6 performs the same function for the fluid flowing through the conduit 2.

A portion of each of the two conduits is jacketed by a casing 7 containing a medium 8, such as water, which is circulated within the casing 7 by any suitable means, such as the circulator 9. When the fluid in the conduit 1 reaches the casing 7 it is caused to pass through a series of tubes 10, and similarly when the fluid in the conduit 2 reaches the casing 7 it is caused to pass through a series of tubes 11. In this way the temperature of the two fluids is brought to substantially the same point which is determined by the temperature of the medium 8 within the casing 7. The medium 8 also circulates around the portions of the conduit in which the thermal elements now to be described are located.

A heater resistance 12 is located in the conduit 1 and a similar heater resistance 13 is located in conduit 2. These resistances have a zero temperature coefficient and have the same ohmic value so that when they are connected in series across the line they will dissipate equal quantities of heat. The conductors from the heater resistances 12 and 13 pass through suitable water-tight conduits 14 and 15 to the exterior of the casing 7. The two heaters are connected in series with an adjusting rheostat 16 by means of which the energy supplied to the heaters may be varied. Current is supplied to the heaters from the mains 17 and 18.

In advance of the heater resistance 12 there is located a thermometer resistance 19, and at the rear of the heater 12 there is located a similar thermometer resistance 20. Likewise, in advance of the heater 13 there is located a thermometer resistance 21, and at the rear of said heater there is located a similar thermometer resistance 22. The four thermometer resistances are preferably made of pure nickel wire and are all calibrated to give like resistance characteristics for varying temperatures. The four thermometer resistances are connected in the form of a Wheatstone bridge having a balancing resistance 23. A galvanometer 24 is connected across the bridge to indicate when the bridge is in a state of balance.

The wiring connections shown in Fig. 1 may be more readily understood from Fig. 2. From this figure it will be seen that the two heaters are connected in series with each other across the line and that the four thermometer resistances are connected in the form of a Wheatstone bridge of which the two resistances 19 and 20 in the conduit 1 constitute two of the legs, and the resistances 21 and 22 in conduit 2 constitute the other two legs. This figure also clearly shows how the galvanometer 24 is connected across the bridge and how the resistance 23 may be used to balance the bridge.

Referring again to Fig. 1 it will be seen that a meter 25 measures the quantity of fluid flowing through the conduit 1, and a similar meter 26 measures the quantity of fluid flowing through the conduit 2. Although I have shown volumetric meters it will be apparent to those skilled in the art that flow meters of any desired form may be employed.

In advance of the pressure regulators 3 and 4 the conduits 1 and 2 are provided with a reversing valve 27, the purpose of which will hereinafter appear. It is the function of this valve to merely interchange the fluids and cause the fluid which first passed through conduit 1 to pass through conduit 2 and to cause the fluid which first passed through conduit 2 to pass through conduit 1. The valve may comprise a stationary portion 28 which receives the ends of the conduits 1 and 2. The movable portion 29 of the valve carries two nozzles 30 and 31 to which flexible tubes 32 and 33 are connected. By loosening the thumb screws 34 the movable portion of the valve may be turned so as to cause the opening in the nozzle 30 to register with the conduit 2 and to cause the opening in the nozzle 31 to register with the conduit 1. It is obvious that if this be done the fluids in the conduits will be interchanged as above described.

Before the operation of the apparatus is explained it should be noted that the Wheatstone bridge will be in a state of balance when the ohmic values of resistances 19 and 20 are equal and when the ohmic values of resistances 21 and 22 are equal, or when the difference between the ohmic values of resistances 19 and 20 is equal to the difference between the ohmic values of resistances 21 and 22. This condition is satisfied with fluid flowing only when (1) the heaters are dissipating no heat, or (2) when the heaters are dissipating heat and when the relative flows of the two fluids are such that the temperature increases in the fluids are the same and will cause the difference in ohmic value between resistances 19 and 20 to exactly equal the difference in ohmic value between the resistances 21 and 22.

The apparatus is used for determining the specific heat of a fluid in the following manner. Some fluid having a known specific heat, such as air, is caused to pass through the conduit 1 and the fluid whose specific heat is to be determined is passed through the conduit 2. Before the heaters 12 and 13 are rendered operative the Wheatstone bridge is balanced by adjusting the rheostat 23. The galvanometer 24 will indicate when the Wheatstone bridge is in a state of balance. Current is then supplied to the heaters 12 and 13 and as no particular consideration has been given to the rate of flow of the fluids through the conduits, the balance of the Wheatstone bridge will be destroyed as soon as the current to the heaters is turned on because the temperature rises in the fluids will be different and therefore the ohmic value of the resistance 20 will not be increased the same amount as the resistance 22.

The valves 5 and 6 are now adjusted so that the rate of flow of one fluid will be so related to the rate of flow of the other fluid that each fluid will have its temperature increased the same amount, or in other words, the valves 5 and 6 are regulated until the balance of the Wheatstone bridge is restored. The ratio of the rates of flow of fluid in the conduits is then ascertained by reading the meters 25 and 26 simultaneously. Under the conditions described above the specific heat of the two fluids will bear inversely the same ratio as the two rates of flow. If S equals the specific heat of the fluid used as a standard, S' equals the specific heat to be determined, Q equals the rate of flow of the standard fluid and Q' equals the rate of flow of the fluid whose specific heat is to be determined, then $\frac{S'}{S}$ is equal to $\frac{Q}{Q'}$ or $S' = \frac{QS}{Q'}$. The values of S, Q and Q' are known and therefore S' may be readily determined. It is now obvious that if the specific heat of the standard fluid is unity, then the specific heat to be determined is equal to the ratio between the rates of flow Q and Q'.

Inaccuracies in the meters 25 and 26 and inaccuracies that may be introduced from other causes may be practically eliminated by manipulating the reversing valve 27 to cause each fluid to flow through the other conduit. The above operations are then repeated and a second ratio between the readings of the meters 25 and 26 is obtained. Thus the mean of these two sets of readings gives a ratio which is practically free of all errors of each system.

It will now be seen that the apparatus may be constructed even in a somewhat crude manner and yet it will give thoroughly accurate results as all errors are cancelled. The apparatus may be operated by an unskilled person and very accurate results may be obtained. The specific heat of any gas per cubic foot is an extremely small quantity and the heat losses during measurement of this characteristic of the gas are usually of considerable magnitude and have heretofore required large corrections of the specific heat measurement. In the present apparatus the two systems are exactly alike in structure and operate under the same temperature conditions so that all heat losses are practically balanced. Furthermore, no direct measurement of the small heat quantities involved is required as the method is wholly one of ratio determination.

That phase of the invention which deals with the interchanging of the fluids may be of considerable value in other relations than that herein described. For instance, wherever a certain characteristic of a fluid is determined relative to another fluid and wherever two sets of measuring means are employed, the errors may be cancelled by interchanging the fluids as above described so that two sets of readings may be obtained which, when combined, will cancel the errors.

Figs. 4 and 5 show a modified form of apparatus in which only one conduit is employed. The conduit is shown at 35 and may have a pressure regulator 36 and regulating valve 37 corresponding to the pressure regulator and regulating valve shown in each conduit in Fig. 1. A meter 38 is also provided similar to the meter shown in each conduit in Fig. 1. A valve 39' similar to that shown at 27 in Fig. 1 may be used to admit to the conduit 35 either the fluid whose specific heat is to be determined, or the standard fluid such as air.

In Figs. 4 and 5 only one heater 39 is employed and only two thermometer resistances 40 and 41 are used. The heater 39 is supplied with current from the mains 42 and 43 and an ammeter or other suitable indicating instrument 44 may be used to indicate the wattage at which the heater is operating. A rheostat 45 may be used to regulate the energy supplied to the heater and to maintain the wattage of the heater constant.

The thermometer resistances 40 and 41 are electrically connected to two like resistances 46 and 47 having a zero temperature coefficient. The connections are such that the four resistances will be connected in the form of a Wheatstone bridge. The balancing rheostat for the Wheatstone bridge is shown at 49. A galvanometer 48 indicates when the Wheatstone bridge is in a state of balance.

This form of the apparatus is used for determining the specific heat of a fluid as follows:

Either the standard fluid, such as air, or the fluid whose specific heat is to be determined is first passed through the conduit 35. The Wheatstone bridge is balanced by adjusting the balancing rheostat 49. Then the balancing rheostat is moved a certain amount to unbalance the Wheatstone bridge. The heater is then supplied with current and is adjusted by means of the rheostat 45 and the rate of flow of the fluid is adjusted, if necessary, by means of the valve 37 until the balance of the Wheatstone bridge is restored. Under these operating conditions the fluid is allowed to flow for a certain period, say five minutes, and the reading of the meter 38 is taken for this interval. The valve 39′ is now operated to admit the second fluid. The valve 37 is then adjusted until the fluid is flowing at such a rate that the Wheatstone bridge will balance. The fluid is allowed to flow for the same period that the first fluid flowed and during this time care is taken that the heater is imparting the same amount of heat to the fluid as it imparted to the fluid in the first case. At the end of the fixed period another reading is taken from the meter 38.

The ratio between the specific heats of the two fluids will be equal to the ratio between the readings obtained from the meter 38. If the specific heat of the standard fluid is unity the unknown specific heat will be the ratio between the readings obtained from the meter 38.

In the form of apparatus shown in Figs. 4 and 5 the fluid must be measured for the same period in each case and care must be taken to maintain the heater at a constant wattage. In the form of apparatus shown in Fig. 1 the time element does not enter into the operation of the apparatus and it is immaterial if the wattage of the heater varies slightly because the same variation will take place in the two heaters and will therefore similarly affect the fluids.

In Fig. 4 as the final result is obtained from the ratio of the readings taken from the same meter 38 it is obvious that any error in the reading of this meter will be cancelled.

While the above described manner of operating the device illustrated in Fig. 4 is usually preferable, I desire it to be understood that accurate results may be obtained with this device by merely ascertaining sequentially the rates of flow of the fluid of known specific heat and the test fluid required to balance the Wheatstone bridge under the conditions imposed.

What I claim is:

1. The method which comprises subjecting a flowing medium of known specific heat and a flowing medium of unknown specific heat to like calorific influence and determining the relative quantities of said mediums required to provide like temperature changes therein and utilizing said determined values to ascertain the specific heat of said second mentioned medium.

2. The method which comprises subjecting a flowing medium of known specific heat and a flowing medium of unknown specific heat to like calorific influence, determining the relative quantities of said mediums required to provide like temperature changes therein under such conditions, and utilizing said known and thus determined values to ascertain mathematically the specific heat of said second mentioned medium.

3. The method of ascertaining the specific heat of a fluid which comprises effecting a flow thereof at a regulable rate and also effecting a flow of fluid of known specific heat, subjecting the two flows to like calorific influence, determining the relative sensitiveness of the fluid streams to such calorific influence, adjusting the relative rates of flow until the two streams show the same change in temperature and determining and comparing such adjusted flows.

4. The method of ascertaining the specific heat of a fluid which comprises subjecting a stream of said fluid and a stream of another medium of known specific heat to like calorific influence, varying the relative rates of flow of said streams until they show the same change of temperature as a result of said calorific influence, and determining and comparing the rates of flow of said streams.

5. The method of determining the specific heat of a fluid which comprises subjecting a stream of such fluid and a stream of fluid of known specific heat to like calorific influence, regulating the rates of flow of said streams to equalize the temperature changes effected therein respectively by such influence, and subsequently measuring and comparing the rates of flow of said fluids, said streams being passed through separate means for effecting such regulation and measurement thereof and thereafter interchanged with respect to such means, the regulation and measurement being thereafter repeated and the mean results calculated.

6. Apparatus for determining a characteristic of a fluid relative to another fluid, comprising two sets of measuring means through which the fluids are simultaneously passed, and means to interchange the fluids so that each fluid will flow through the measuring means through which the other fluid previously flowed so that when the two sets of readings are utilized the errors will be canceled.

7. Apparatus for determining the specific heat of a fluid comprising a pair of conduits, means whereby heat may be imparted at the same rate to fluid flowing in each conduit, means to indicate when the heat produces the same effect on both streams of fluid, means to regulate the rate of flow of the fluid in each conduit, and means to measure the rate of flow of fluid flowing through each conduit.

8. Apparatus for determining the specific heat of a fluid comprising a pair of conduits, means whereby heat may be imparted at the same rate to fluid flowing in each conduit, means to indicate when the temperature rise produced in the two streams of fluid is the same, means to regulate the flow of fluid in each conduit, and means to measure the rate of flow of fluid flowing through each conduit.

9. Apparatus for determining the specific heat of a fluid comprising a pair of conduits, thermal elements located in said conduits, means to measure the rate of flow of fluid flowing through each conduit, means to regulate the flow of fluid in each conduit for given effects on certain of said thermal elements, and means to bring the two fluids to substantially the same temperature before they reach said thermal elements.

10. Apparatus for determining the specific heat of a fluid comprising a pair of conduits, a pressure regulator located in each conduit, means to regulate the flow of fluid in each conduit, thermal elements located in each conduit to indicate conditions governing such regulation, means to bring the fluids to the same temperature before they reach said thermal elements, and means to measure the rate of flow of fluid flowing through each conduit.

11. Apparatus for determining the specific heat of a fluid comprising a pair of conduits, means associated with said conduits for obtaining readings of the rates of flow of the fluids in said conduits to be used in determination of the specific heat of one of the fluids, and means to interchange the fluids in the conduits so that a second set of readings may be obtained which when combined with the first set of readings will serve to cancel errors.

12. Apparatus for determining the specific heat of a fluid comprising a pair of conduits through which two fluids may be passed, means for producing like thermal changes in the fluids when one is flowing at a certain rate with respect to the other, means to adjust the rate of flow of the fluid in each conduit to bring about said like thermal changes, and means to measure the rate of flow of fluid flowing in each conduit.

13. Apparatus for determining the specific heat of a fluid, comprising separate conduits, separate means for regulating the flow of fluid in said conduits, separate means for measuring the rates of flow through said conduits, and readily adjustable means to interchangeably connect said conduits to separate fluid supply lines.

14. The method of determining the specific heat of a fluid which includes effecting a flow thereof at a known rate such that the temperature effect on the stream thereof of a given calorific influence is equal to the temperature effect of such influence on a stream of fluid of known specific heat flowing at a known rate, and comparing the rates of flow of said fluids.

15. The method of determining the specific heat of a fluid which comprises effecting a flow thereof at a regulable known rate, relatively adjusting such rate and the rate of a stream of fluid of known specific heat to effect an equal temperature rise in the respective flowing fluids by a given calorific influence, the rate of flow of such latter fluid being known, and comparing such adjusted rates of flow of the fluids.

16. The method of determining the specific heat of a fluid which comprises causing a flow thereof at a regulable known rate, subjecting the fluid so flowing and a fluid of known specific heat also flowing at a regulable known rate to like calorific influence, regulating the rates of flow of said fluids to equalize the temperature changes so effected therein and thereafter comparing the rates of flow of said fluids.

17. The method of determining the specific heat of a fluid which comprises causing a flow thereof at a regulable known rate, subjecting the fluid so flowing and a fluid of known specific heat also flowing at a regulable known rate, to like calorific influence, so regulating the rates of flow of said fluids that the ratio of said rates of flow is inversely proportional to the ratio of the specific heats of said fluids, such a relation being indicated when such streams of fluid are found to be equally affected by such calorific influence, and thereafter comparing the rates of flow of said fluids.

18. The method of determining the specific heat of a fluid which comprises subjecting a stream of such fluid, and a stream of fluid of known specific heat to like calorific influence, regulating the rates of flow of said streams to equalize the temperature changes effected therein respectively by such influence and subsequently measuring and comparing the rates of flow of said fluids, said streams being passed separately through the same means for regulation and measurement thereof.

19. Apparatus for determining the specific heat of a fluid, comprising a conduit, means to regulate the flow of fluid through said conduit, means to measure the rate of flow of fluid passing through said conduit and readily adjustable means for connecting said conduit to a plurality of fluid supply lines selectively.

20. Apparatus for determining the specific heat of a fluid comprising a conduit, means to impart heat to a fluid flowing through the conduit, indicating means responsive to the effect upon the fluid of the heat imparted thereto, means to regulate the rate at which the fluid is permitted to flow past the heating means, and means to measure the rate of flow of fluid flowing through the conduit.

In witness whereof, I have hereunto subscribed my name.

HORACE N. PACKARD.